United States Patent
Furukawa

(10) Patent No.: US 9,418,233 B2
(45) Date of Patent: Aug. 16, 2016

(54) INFORMATION PROCESSING DEVICE FOR HANDLING PRIVACY INFORMATION, INFORMATION PROCESSING SYSTEM FOR HANDLING PRIVACY INFORMATION, AND INFORMATION PROCESSING METHOD AND PROGRAM FOR HANDLING PRIVACY INFORMATION

(71) Applicant: Ryo Furukawa, Tokyo (JP)

(72) Inventor: Ryo Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/379,427

(22) PCT Filed: Feb. 15, 2013

(86) PCT No.: PCT/JP2013/000825
§ 371 (c)(1),
(2) Date: Aug. 18, 2014

(87) PCT Pub. No.: WO2013/121790
PCT Pub. Date: Aug. 22, 2013

(65) Prior Publication Data
US 2015/0012965 A1  Jan. 8, 2015

(30) Foreign Application Priority Data

Feb. 17, 2012 (JP) .................. 2012-032991

(51) Int. Cl.
| | | |
|---|---|---|
| G06F 21/00 | (2013.01) | |
| G06F 21/60 | (2013.01) | |
| G06Q 50/10 | (2012.01) | |
| G06F 17/30 | (2006.01) | |
| H04L 29/06 | (2006.01) | |
| G06F 21/62 | (2013.01) | |

(52) U.S. Cl.
CPC .......... *G06F 21/60* (2013.01); *G06F 17/30082* (2013.01); *G06F 21/6245* (2013.01); *G06Q 50/10* (2013.01); *H04L 63/04* (2013.01); *H04L 63/20* (2013.01)

(58) Field of Classification Search
USPC .............................................. 726/1
See application file for complete search history.

(56) References Cited

U.S. PATENT DOCUMENTS

| 8,762,412 B2* | 6/2014 | Lim .............................. 707/783 |
|---|---|---|
| 2004/0054918 A1* | 3/2004 | Duri et al. ..................... 713/200 |

(Continued)

FOREIGN PATENT DOCUMENTS

| JP | 2004-192353 A | 7/2004 |
|---|---|---|
| JP | 2009-258826 A | 11/2009 |

OTHER PUBLICATIONS

"Privacy, information technology, and health care"; TC Rindfleisch—Communications of the ACM, 1997.*

(Continued)

*Primary Examiner* — Jason Lee

(57) ABSTRACT

An information processing device for handling privacy information includes: a similar user extraction means for extracting a set of other user's identifiers that is similar to a user identifier inputted by a user when a conflict takes place between a policy inputted by a user, who is a privacy information holder, and a policy of services that is already set for each of service providers, who is a privacy information user; and a policy recommendation means for acquiring a set of policies based on the set of extracted user identifiers and a service identifier inputted by the user and outputting thereof.

10 Claims, 17 Drawing Sheets

(56) References Cited

U.S. PATENT DOCUMENTS

| | | | | |
|---|---|---|---|---|
| 2010/0205452 | A1* | 8/2010 | Griffin | H04L 9/3231 713/186 |
| 2012/0096523 | A1* | 4/2012 | Ollila et al. | 726/5 |
| 2012/0204222 | A1 | 8/2012 | Bodi et al. | |
| 2012/0324529 | A1* | 12/2012 | Rangachari et al. | 726/1 |

OTHER PUBLICATIONS

W3C, "Platform for Privacy Preferences (P3P) Project", Platform for Privacy Preferences Initiative, Technology and Society Domain, Oct. 3, 2007, [Internet] <URL: http://www.w3.org/p3p>.

Makoto Hatakeyama et al. "Privacy Policy Negotiation Framework for Attribute Exchange", W3C Workshop on Languages for Privacy Policy Negotiation and Semantics-Driven Enforcement, 2006, <URL: http://www.w3.org/2006/07/privacy-ws/papers/22-hatakeyama-negotiation-attributes/>.

Ryo Furukawa, "A Privacy Policy Negotiation Method Based on Policy Ranking", CSS2011 Computer Security Symposium 2011, Ronbunshu Heisai Anti-Malware Engineering Workshop 2011, IPSJ Symposium Series, vol. 2011, No. 3 [CD-ROM], Oct. 12, 2011, pp. 253-258 with English Abstract.

International Search Report for PCT Application No. PCT/JP2013/000825, mailed on Mar. 12, 2013.

* cited by examiner

Fig.6

```
<Policy>
  <Rule datatype="Name">
    <Action>
     PROVIDE
    </Action>
  </Rule>
   <Rule datatype="Address">
    <Action>
     NOT PROVIDE
    </Action>
  </Rule>
  <Rule datatype="Position">
    <Action>
     NOT PROVIDE
    </Action>
  </Rule>
   <Rule datatype="Buying">
    <Action>
     PROVIDE
    </Action>
  </Rule>
</Policy>
```

Fig. 7

| USER IDENTIFIER | SERVICE IDENTIFIER | POLICY |
|---|---|---|
| 1 | 1 | <Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>PROVIDE</Action></Rule></Policy> |
| 1 | 2 | <Policy><Rule datatype="Name"><Action>PROVIDE</Action></Rule><Rule datatype="Address"><Action>PROVIDE</Action></Rule><Rule datatype="Position"><Action>NOT PROVIDE</Action></Rule><Rule datatype="Buying"><Action>NOT PROVIDE</Action></Rule></Policy> |
| 2 | 1 | <Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>PROVIDE</Action></Rule></Policy> |
| 2 | 2 | <Policy><Rule datatype="Name"><Action>PROVIDE</Action></Rule><Rule datatype="Address"><Action>PROVIDE</Action></Rule><Rule datatype="Position"><Action>NOT PROVIDE</Action></Rule><Rule datatype="Buying"><Action>NOT PROVIDE</Action></Rule></Policy> |
| 2 | 3 | <Policy><Rule datatype="Name"><Action>PROVIDE</Action></Rule><Rule datatype="Address"><Action>PROVIDE</Action></Rule><Rule datatype="Position"><Action>PROVIDE</Action></Rule><Rule datatype="Buying"><Action>NOT PROVIDE</Action></Rule></Policy> |
| 3 | 1 | <Policy><Rule datatype="Name"><Action>PROVIDE</Action></Rule><Rule datatype="Address"><Action>PROVIDE</Action></Rule><Rule datatype="Position"><Action>PROVIDE</Action></Rule><Rule datatype="Buying"><Action>NOT PROVIDE</Action></Rule></Policy> |
| 3 | 2 | <Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>NOT PROVIDE</Action></Rule></Policy> |
| 3 | 3 | <Policy><Rule datatype="Name"><Action>NOT PROVIDE</Action></Rule><Rule datatype="Address"><Action>NOT PROVIDE</Action></Rule><Rule datatype="Position"><Action>PROVIDE</Action></Rule><Rule datatype="Buying"><Action>PROVIDE</Action></Rule></Policy> |
| 4 | 2 | <Policy><Rule datatype="Name"><Action>PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>NOT PROVIDE</Action></Rule></Policy> |
| 4 | 3 | <Policy><Rule datatype="Name"><Action>PROVIDE</Action></Rule><Rule datatype="Address"><Action>NOT PROVIDE</Action></Rule><Rule datatype="Position"><Action>PROVIDE</Action></Rule><Rule datatype="Buying"><Action>NOT PROVIDE</Action></Rule></Policy> |

Fig. 8

| USER IDENTIFIER | SERVICE POLICY |
|---|---|
| 1 | <Policy><Rule datatype="Name"><Action>PROVIDE </Action></Rule><Rule datatype="Address"><Action> NOT PROVIDE </Action></Rule><Rule datatype="Position"><Action> NOT PROVIDE </Action></Rule><Rule datatype="Buying"><Action> PROVIDE </Action></Rule></Policy> |

Fig. 9

| SERVICE IDENTIFIER | SERVICE POLICY |
|---|---|
| 3 | <Policy><Rule datatype="Name"><Action>PROVIDE </Action></Rule><Rule datatype="Address"><Action> PROVIDE </Action></Rule><Rule datatype="Position"><Action> PROVIDE </Action></Rule><Rule datatype="Buying"><Action> PROVIDE </Action></Rule></Policy> |

Fig. 10

| SERVICE IDENTIFIER | POLICY |
|---|---|
| 1 | <Policy><Rule datatype="Name"><Action> NOT PROVIDE </Action></Rule><Rule datatype="Address"><Action> NOT PROVIDE </Action></Rule><Rule datatype="Position"><Action> NOT PROVIDE </Action></Rule><Rule datatype="Buying"><Action> PROVIDE </Action></Rule></Policy> |
| 2 | <Policy><Rule datatype="Name"><Action>PROVIDE </Action></Rule><Rule datatype="Address"><Action> PROVIDE </Action></Rule><Rule datatype="Position"><Action> NOT PROVIDE </Action></Rule><Rule datatype="Buying"><Action> NOT PROVIDE </Action></Rule></Policy> |

Fig. 11

| USER IDENTIFIER | SERVICE IDENTIFIER | POLICY |
|---|---|---|
| 1 | 1 | <Policy><Rule datatype="Name"><Action> NOT PROVIDE </Action></Rule><Rule datatype="Address"><Action> NOT PROVIDE </Action></Rule><Rule datatype="Position"><Action> NOT PROVIDE </Action></Rule><Rule datatype="Buying"><Action> PROVIDE </Action></Rule></Policy> |
| | 2 | <Policy><Rule datatype="Name"><Action> PROVIDE </Action></Rule><Rule datatype="Address"><Action> PROVIDE </Action></Rule><Rule datatype="Position"><Action> NOT PROVIDE </Action></Rule><Rule datatype="Buying"><Action> NOT PROVIDE </Action></Rule></Policy> |
| | 3 | <Policy><Rule datatype="Name"><Action> PROVIDE </Action></Rule><Rule datatype="Address"><Action> PROVIDE </Action></Rule><Rule datatype="Position"><Action> PROVIDE </Action></Rule><Rule datatype="Buying"><Action> NOT PROVIDE </Action></Rule></Policy> |
| 3 | 1 | <Policy><Rule datatype="Name"><Action> PROVIDE </Action></Rule><Rule datatype="Address"><Action> PROVIDE </Action></Rule><Rule datatype="Position"><Action> PROVIDE </Action></Rule><Rule datatype="Buying"><Action> NOT PROVIDE </Action></Rule></Policy> |
| | 2 | <Policy><Rule datatype="Name"><Action> NOT PROVIDE </Action></Rule><Rule datatype="Address"><Action> NOT PROVIDE </Action></Rule><Rule datatype="Position"><Action> NOT PROVIDE </Action></Rule><Rule datatype="Buying"><Action> NOT PROVIDE </Action></Rule></Policy> |
| | 3 | <Policy><Rule datatype="Name"><Action> NOT PROVIDE </Action></Rule><Rule datatype="Address"><Action> NOT PROVIDE </Action></Rule><Rule datatype="Position"><Action> PROVIDE </Action></Rule><Rule datatype="Buying"><Action> PROVIDE </Action></Rule></Policy> |
| 4 | 2 | <Policy><Rule datatype="Name"><Action> PROVIDE </Action></Rule><Rule datatype="Address"><Action> NOT PROVIDE </Action></Rule><Rule datatype="Position"><Action> NOT PROVIDE </Action></Rule><Rule datatype="Buying"><Action> NOT PROVIDE </Action></Rule></Policy> |
| | 3 | <Policy><Rule datatype="Name"><Action> PROVIDE </Action></Rule><Rule datatype="Address"><Action> NOT PROVIDE </Action></Rule><Rule datatype="Position"><Action> PROVIDE </Action></Rule><Rule datatype="Buying"><Action> NOT PROVIDE </Action></Rule></Policy> |

Fig. 12

| SET | SERVICE IDENTIFIER | POLICY |
|---|---|---|
| S1 | 1 | <Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>PROVIDE</Action></Rule></Policy> |
| | 2 | <Policy><Rule datatype="Name"><Action>PROVIDE</Action></Rule><Rule datatype="Address"><Action>PROVIDE</Action></Rule><Rule datatype="Position"><Action>NOT PROVIDE</Action></Rule><Rule datatype="Buying"><Action>NOT PROVIDE</Action></Rule></Policy> |
| S2 | 1 | <Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>PROVIDE</Action></Rule></Policy> |
| | 2 | <Policy><Rule datatype="Name"><Action>PROVIDE</Action></Rule><Rule datatype="Address"><Action>PROVIDE</Action></Rule><Rule datatype="Position"><Action>NOT PROVIDE</Action></Rule><Rule datatype="Buying"><Action>NOT PROVIDE</Action></Rule></Policy> |
| | 3 | <Policy><Rule datatype="Name"><Action>PROVIDE</Action></Rule><Rule datatype="Address"><Action>PROVIDE</Action></Rule><Rule datatype="Position"><Action>PROVIDE</Action></Rule><Rule datatype="Buying"><Action>NOT PROVIDE</Action></Rule></Policy> |

Fig. 13

| CODE | POLICY |
|---|---|
| P1 | <Policy><Rule datatype="Name"><Action>NOT PROVIDE </Action></Rule><Rule datatype="Address"><Action>NOT PROVIDE </Action></Rule><Rule datatype="Position"><Action> NOT PROVIDE </Action></Rule><Rule datatype="Buying"><Action> PROVIDE </Action></Rule></Policy> |
| P2 | <Policy><Rule datatype="Name"><Action>NOT PROVIDE </Action></Rule><Rule datatype="Address"><Action>NOT PROVIDE </Action></Rule><Rule datatype="Position"><Action> NOT PROVIDE </Action></Rule><Rule datatype="Buying"><Action> PROVIDE </Action></Rule></Policy> |

Fig.14

| USER IDENTIFIER | SERVICE IDENTIFIER | DISTANCE |
|---|---|---|
| 2 | 1 | 0 |
| 2 | 2 | 0 |
| 3 | 1 | 4 |
| 3 | 2 | 2 |
| 4 | 1 | 0 |
| 4 | 2 | 1 |

Fig.15

| USER IDENTIFIER | DEGREE OF SIMILARITY |
|---|---|
| 2 | 1 |
| 3 | 1/15 |
| 4 | 1/2 |

Fig. 16

| RECOMMENDED POLICY |
|---|
| <Policy><Rule datatype="Name"><Action>PROVIDE </Action></Rule><Rule datatype="Address"><Action>PROVIDE </Action></Rule><Rule datatype="Position"><Action> PROVIDE </Action></Rule><Rule datatype="Buying"><Action> NOT PROVIDE </Action></Rule></Policy> |
| <Policy><Rule datatype="Name"><Action>PROVIDE </Action></Rule><Rule datatype="Address"><Action>NOT PROVIDE </Action></Rule><Rule datatype="Position"><Action> PROVIDE </Action></Rule><Rule datatype="Buying"><Action> NOT PROVIDE </Action></Rule></Policy> |

Fig. 17

| USER IDENTIFIER | SERVICE IDENTIFIER | SERVICE POLICY |
|---|---|---|
| 1 | 1 | `<Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>PROVIDE</Action></Rule></Policy>` |
| 1 | 2 | `<Policy><Rule datatype="Name"><Action>PROVIDE</Action></Rule><Rule datatype="Address"><Action>PROVIDE</Action></Rule><Rule datatype="Position"><Action>NOT PROVIDE</Action></Rule><Rule datatype="Buying"><Action>NOT PROVIDE</Action></Rule></Policy>` |
| 1 | 3 | `<Policy><Rule datatype="Name"><Action>PROVIDE</Action></Rule><Rule datatype="Address"><Action>NOT PROVIDE</Action></Rule><Rule datatype="Position"><Action>PROVIDE</Action></Rule><Rule datatype="Buying"><Action>NOT PROVIDE</Action></Rule></Policy>` |
| 2 | 1 | `<Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>PROVIDE</Action></Rule></Policy>` |
| 2 | 2 | `<Policy><Rule datatype="Name"><Action>PROVIDE</Action></Rule><Rule datatype="Address"><Action>PROVIDE</Action></Rule><Rule datatype="Position"><Action>NOT PROVIDE</Action></Rule><Rule datatype="Buying"><Action>NOT PROVIDE</Action></Rule></Policy>` |
| 2 | 3 | `<Policy><Rule datatype="Name"><Action>PROVIDE</Action></Rule><Rule datatype="Address"><Action>PROVIDE</Action></Rule><Rule datatype="Position"><Action>PROVIDE</Action></Rule><Rule datatype="Buying"><Action>NOT PROVIDE</Action></Rule></Policy>` |
| 3 | 1 | `<Policy><Rule datatype="Name"><Action>PROVIDE</Action></Rule><Rule datatype="Address"><Action>PROVIDE</Action></Rule><Rule datatype="Position"><Action>PROVIDE</Action></Rule><Rule datatype="Buying"><Action>NOT PROVIDE</Action></Rule></Policy>` |
| 3 | 2 | `<Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>NOT PROVIDE</Action></Rule></Policy>` |
| 3 | 3 | `<Policy><Rule datatype="Name"><Action>NOT PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>PROVIDE</Action></Rule></Policy>` |
| 4 | 2 | `<Policy><Rule datatype="Name"><Action>PROVIDE</Action></Rule><Rule datatype="Address"><Action>NOT PROVIDE</Action></Rule><Rule datatype="Position"><Action>NOT PROVIDE</Action></Rule><Rule datatype="Buying"><Action>NOT PROVIDE</Action></Rule></Policy>` |
| 4 | 3 | `<Policy><Rule datatype="Name"><Action>PROVIDE</Action></Rule><Rule datatype="Address"><Action>NOT PROVIDE</Action></Rule><Rule datatype="Position"><Action>PROVIDE</Action></Rule><Rule datatype="Buying"><Action>NOT PROVIDE</Action></Rule></Policy>` |

INFORMATION PROCESSING DEVICE FOR HANDLING PRIVACY INFORMATION, INFORMATION PROCESSING SYSTEM FOR HANDLING PRIVACY INFORMATION, AND INFORMATION PROCESSING METHOD AND PROGRAM FOR HANDLING PRIVACY INFORMATION

This application is a National Stage Entry of PCT/JP2013/000825 filed on Feb. 15, 2013, which claims priority from Japanese Patent Application 2012-032991 filed on Feb. 17, 2012, the contents of all of which are incorporated herein by reference, in their entirety.

TECHNICAL FIELD

The present invention relates to a technology of a privacy policy, and in particular relates to a technology of setting an appropriate policy between a privacy information holder and a privacy information user.

BACKGROUND ART

In recent years, services in which it acquires attribute information (i.e. age, sex and address) and behavior information (i.e. position information and products buying information) of the privacy information holder, and utilizes them for distribution of advertisements that meet preference of the privacy information holder, is becoming popular.

In these services, because the attribute information and the behavior information are privacy information, when the privacy information user who is a service provider acquires or utilizes the attribute information and the behavior information one-sidedly, privacy of the privacy information holder will be invaded. Therefore, it is requested that the privacy information holder can control how to handle the privacy information (i.e. conditions of disclosure and data protection requirements or the like) by the privacy information user.

As a method of these kind of controls, there is a control method of a policy base using P3P (Platform for Privacy Preferences) or the like, which is described in Non-Patent Literature 1.

The P3P technology controls how to handle the privacy information as follows. As a presupposition, the privacy information user, who provides service, sets a policy file (hereinafter, referred to as "service policy") written in XML which described privacy information to be collected and a handling method thereof. In addition, the privacy information holder sets a policy file (hereinafter, referred to as "user policy") written in XML which described privacy information that can be provided and a data disclosure method thereof. Following to the P3P technology, it automatically or semi-automatically executes judgment on whether it discloses the data or not by investigating whether conditions of data disclosure are matched between the user policy and the service policy.

Following to the P3P technology, when the user policy and the service policy may conflict and it cannot reach to a consensus of the data disclosure (e.g. when conditions of the data disclosure do not match each other), the privacy information user cannot use the data any more or the privacy information holder cannot receive services any more. Therefore, it needs to build the consensus of policies between the privacy information holder and the privacy information user. This kind of consensus building method of the policies between two persons is called a policy arbitration method.

An example of the policy arbitration method is described in Non-Patent Literature 2. The policy arbitration method described in Non-Patent Literature 2 includes a privacy information holding terminal and a privacy information using terminal and these are connected through a network.

The policy arbitration method described in Non-Patent Literature 2 includes the following processes.

That is, the privacy information using terminal transmits a usage policy (i.e. service policy) to the privacy information holding terminal.

The privacy information holding terminal compares the usage policy and the privacy policy (i.e. user policy), and transmits attribute information on the privacy information holder when there is no conflict.

When there is a conflict, the privacy information holding terminal transmits conditions on usage and holding to the privacy information using terminal.

The privacy information using terminal creates a new usage policy so as to meet the conditions, and transmits the created usage policy to the privacy information holding terminal.

The policy arbitration method described in Non-Patent Literature 2 performs the policy arbitration by repeating the above-mentioned transmission and comparison of the policies, transmission of the conditions and creation of a new policy until it will be formed a mutual agreement.

The same technology as that described in Non-Patent Literature 2 is also disclosed in Patent Literature 1.

In addition, other technology in relation to the present invention is disclosed in Patent Literature 2.

Patent Literature 2 discloses an access restriction information output device which outputs contents of an access restriction corresponding to information that is accessible by an information processing terminal, as access restriction information.

According to Patent Literature 2, a storage means stores, on each set user, already set access restriction information that is access restriction information showing contents of already set access restriction in each item divided based on a specified criterion.

An output request reception means receives an output request of the access restriction information and designation of an item of a request target from a terminal device used by a requester.

A selection means selects at least one piece of the already set access restriction information of other person having contents similar to the already set access restriction information of the requester of the already set access restriction information stored in the storage means.

An output means outputs contents corresponding to the designated item among the contents shown by the selected already set access restriction information to a terminal device as access restriction information.

By adopting the aforementioned configuration, the access control information output unit disclosed in Patent Literature 2 can set access restriction information which matches with intention of the requester in a trouble-free manner.

CITATION LIST

Patent Literatures

Patent Literature 1: Japanese Patent Application Laid-Open No. 2004-192353

Patent Literature 2: Japanese Patent Application Laid-Open No. 2009-258826

Non-Patent Literature

Non-Patent Literature 1: http://www.w3.org/p3p
Non-Patent Literature 2: Makoto Hatakeyama, Hidehito Gomi, "Privacy Policy Negotiation Framework for Attribute Exchange", W3C Workshop on Languages for Privacy Policy Negotiation and Semantics-Driven Enforcement, 2006, http://www.w3.org/2006/07/privacy-ws/papers/22-hatakeyama-negotiation-attributes/

SUMMARY OF INVENTION

Technical Problem

According to the technologies disclosed in Non-Patent Literature 2 and Patent Literature 1, it can flexibly obtain agreements between the privacy information holder and the privacy information user by performing a plurality of times of dialogues, even in a case that conflicts of policies take place between the privacy information holder and the privacy information user.

However, it requires a high load for the privacy information holder if the privacy information holder flexibly performs the policy arbitration with variously existing privacy information user.

In other words, when the privacy information holder decides policies with a plurality of privacy information users, it requires performing a plurality of times of dialogues for each of the plurality of privacy information users, and the technology disclosed in Non-Patent Literature 2 and Patent Literature 1 requires complicated dialogues and a load becomes high.

On the other hand, the technology disclosed in Patent Literature 2 can set access restriction information which matches with the intention of the requester in a trouble-free manner.

However, the technology disclosed in Patent Literature 2 is the technology on the access control policy, and not the technology on the privacy policy. Therefore, if it follows with the technology disclosed in Patent Literature 2, it cannot settle a problem of performing the policy arbitrations when conflicts take place among policies.

As described above, the object of the present invention is to provide a technology on easily decide policies in a trouble-free manner between the privacy information holder and the privacy information user when the conflicts may take place among policies.

Solution to Problem

In order to achieve the above-mentioned object, an information processing device for handling privacy information according to the present invention including: a similar user extraction means for extracting a set of other user's identifiers that is similar to a user identifier inputted by a user when a conflict takes place between a policy inputted by a user, who is a privacy information holder, and a policy of services that is already set for each of service providers, who is a privacy information user; and a policy recommendation means for acquiring a set of policies based on the set of extracted user identifiers and a service identifier inputted by the user and outputting thereof.

Further, in order to achieve the above-mentioned object, an information processing system for handling privacy information according to the present invention including: the information processing device for handling the privacy information; and a user terminal for transmitting a policy that is selected by user's input among a set of policies that is outputted from the policy recommendation means to the information processing device for handling the privacy information. Further, in order to achieve the above-mentioned object, a user terminal according to the present invention transmits a policy that is selected by the user's input among a set of policies that is outputted by the policy recommendation means of the information processing device for handling the privacy information to the information processing device for handling the privacy information.

Further, in order to achieve the above-mentioned object, an information processing method for handling privacy information according to the present invention, comprising: extracting a set of other user's identifiers that is similar to a user identifier inputted by a user when a conflict takes place between a policy inputted by the user, who is a privacy information holder, and a policy of services that is already set for each of service providers, who is a privacy information user; and acquiring a set of policies based on a set of the extracted user identifiers and a service identifier that is inputted by the user and outputting thereof.

Further, in order to achieve the above-mentioned object, a program for a computer to execute processes according to the present invention, comprising: extracting a set of other user's identifiers that is similar to a user identifier that is inputted by a user when a conflict takes place between a policy inputted by a user, who is a privacy information holder, and a policy of services that is already set for each of service providers, who is a privacy information user, and acquiring a set of policies based on a set of the extracted user identifiers and a service identifier that is inputted by the user and outputting thereof.

Advantageous Effects of Invention

According to a technology disclosed in the present invention, it can easily decide policies in a trouble-free manner between the privacy information holder and the privacy information user when conflicts took place among policies.

BRIEF DESCRIPTION OF DRAWINGS

FIG. 6 is a diagram showing an example of a policy according to the present exemplary example.

FIG. 7 is a diagram showing an example of data stored in a policy storage unit 101.

FIG. 8 is a diagram showing an example of a user policy of a user with user identifier=1.

FIG. 9 is a diagram showing an example of a service policy of a service provider with service identifier=3.

FIG. 10 is a diagram showing an example of a set of tuple of (service identifier and policy) which a user extraction unit 106 extracts.

FIG. 11 is a diagram showing an example of a set of tuple of (user identifier and set of tuple of (service identifier and policy)) which the user extraction unit 106 extracts.

FIG. 12 is a diagram showing an example of S1 and S2 which are inputted to the degree of similarity computation unit 107.

FIG. 13 is a diagram showing an example of a policy which the degree of similarity computation unit 107 acquires for service identifier=1.

FIG. 14 is a diagram showing a distance on each of service identifiers corresponding to a specified user identifier and is a target for a degree of similarity computation.

FIG. 15 is a diagram showing a degree of similarity between user identifier=1 and other specified user identifiers.

FIG. 16 is a diagram showing an example of a set of policies that is recommended to the user.

FIG. 17 is a diagram showing a state when data of the policy storage unit 101 is updated according to the present invention.

DESCRIPTION OF EMBODIMENTS

First Exemplary Embodiment

It will describe in details the first exemplary embodiment of the present invention with reference to the drawings.

First, on the assumption, according to the exemplary embodiment, data attributes and actions for each of data attributes (i.e. how to handle the privacy information) are defined in the policy. The data attribute is a numerical value for identifying nature of data and includes attribute information including a name, an age and an address or the like and behavior information including position information and buying information or the like. The action for each of data attributes describes a way of handle the privacy information.

The way of handling the privacy information includes a way of handling of "provide" or "not provide" of the privacy information, and a way of handling such as "for the privacy information, a protection process is implemented and then provides". A mode of providing the privacy information after implementing the protection process includes a way of handling such as "provides after encrypted" or "provides after noises are added" or the like.

Figure 1:
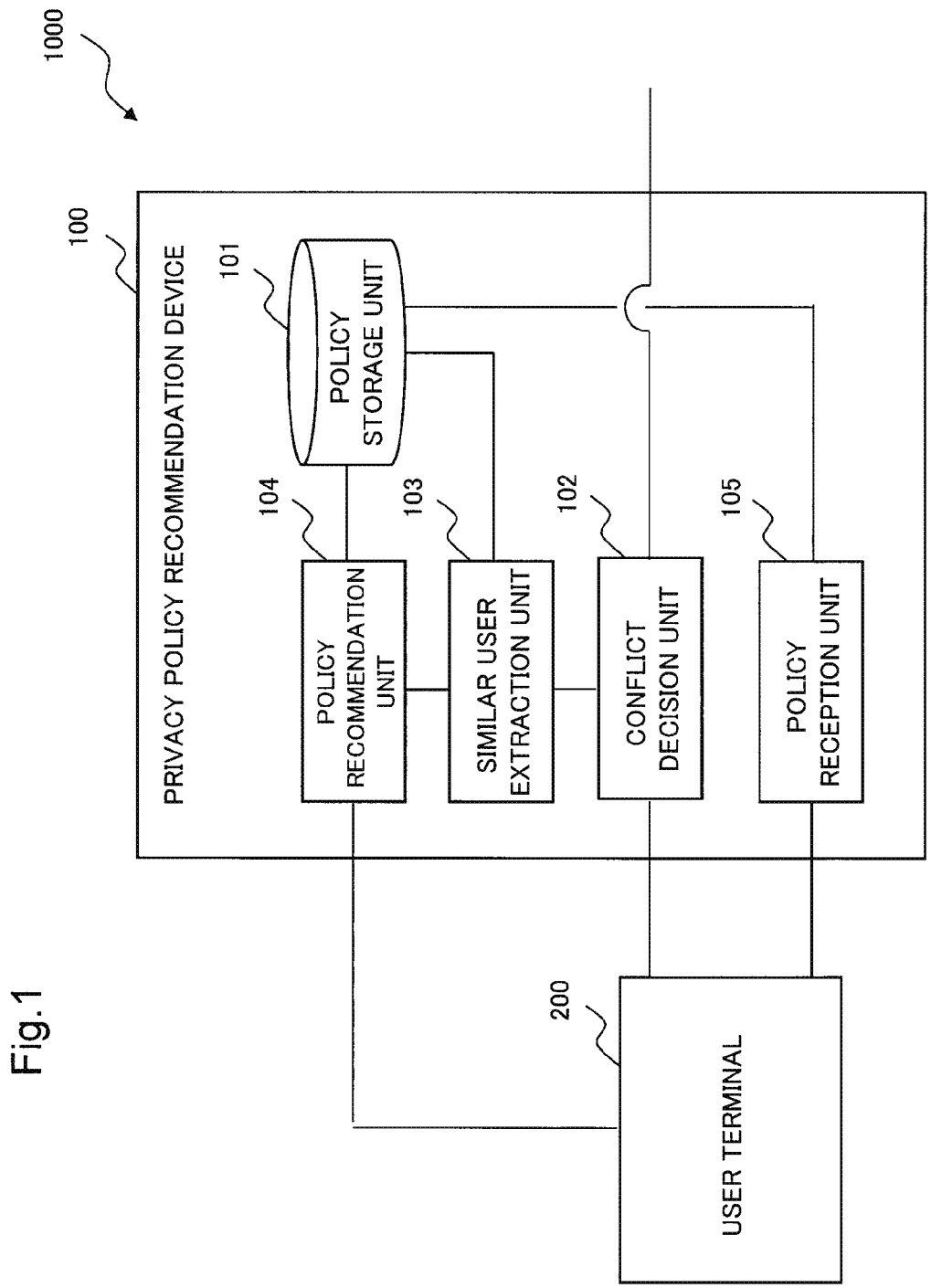
FIG. 1 is a block diagram showing a configuration of a privacy policy recommendation system 1000 according to the first exemplary embodiment of the present invention.

FIG. 1 is the block diagram showing the configuration of the privacy policy recommendation system 1000 according to the first exemplary embodiment of the present invention. As shown in FIG. 1, the privacy policy recommendation system 1000 includes the privacy policy recommendation device 100 and the user terminal 200. In addition, the privacy policy recommendation device 100 includes the policy storage unit 101, a conflict decision unit 102, the similar user extraction unit 103, a policy recommendation unit 104 and a policy reception unit 105.

The policy storage unit 101 stores the user identifiers that identify the privacy information holders who are users, the service identifiers that identify the privacy information users who are service providers and the policies that specify handling of privacy information for each of the user identifiers and the service identifiers.

The conflict decision unit 102 determines whether a conflict exists between the policy data that is inputted by the user and the service policy already set for each of service providers. Further, descriptions of "inputted by a user", "when these are inputted by a user" and "those which are inputted by a user" also includes an input by a person other than the user who reflects the user's will in addition to an input by the user himself/herself.

Specifically, the user identifier of the user, the service identifier of a service that the user wants to receive and a user policy which specifies a way of handling of privacy information, are inputted to the conflict decision unit 102 by a user via the user terminal 200.

The conflict decision unit 102 acquires from the service provider a service policy corresponding to the service identifier that is inputted by the user.

The conflict decision unit 102 determines whether a conflict exists between the user policy inputted by the user and the service policy acquired from the service provider. When it determines that a conflict exists, the conflict decision unit 102 outputs the user identifier that is inputted by the user, the service identifier and an execution instruction of an extraction operation to the similar user extraction unit 103. When it determines that the conflict does not exist, the conflict decision unit 102 prompts provisions of services to the service provider, and wait for further input of data by the user.

When the conflict decision unit 102 determined that the conflict exists, the similar user extraction unit 103 receives the execution instruction of the extraction operation, and extracts a set of other user's user identifiers that is similar to the user identifier that is inputted by the user, from the policy storage unit 101. Where, the similar user extraction unit 103 may determine whether the user identifier is similar or not by whether the service identifier and the policy corresponding to the user identifier are similar or not.

Specifically, the similar user extraction unit 103 extracts, as a specified set, other user's identifiers in which service identifiers and the policies which are similar to the service identifier and the policy corresponding to the user identifier inputted by the user were set, among the data which are stored in the policy storage unit 101. Where, concerning whether the service identifier and the policy are similar or not, the similar user extraction unit 103 may determine that these are similar when the service identifiers are the same and the policies are similar, and these are not similar when the service identifiers are different or the service identifiers are the same and the policies are not similar.

The similar user extraction unit 103 outputs a set of extracted user identifiers to the policy recommendation unit 104. In addition, the similar user extraction unit 103 outputs the service identifier that is inputted by the user to the policy recommendation unit 104.

The policy recommendation unit 104 acquires a set of policies from the policy storage unit 101 based on the set of user identifiers that is inputted from the similar user extraction unit 103 and the service identifier that is inputted by the user.

The policy recommendation unit 104 outputs the set of policies acquired from the policy storage unit 101 to the user terminal 200.

The policy reception unit 105 receives the policy which the user selected among the set of policies which was outputted from the policy recommendation unit 104, correlates with the user identifier and the service identifier, and stores in the policy storage unit 101.

The user terminal 200 accepts the above-mentioned user identifier, the service identifier and the user policy that are inputted by the user. The user terminal 200 outputs the user identifier, the service identifier and the user policy that are inputted by the user, to the conflict decision unit 102.

Further, the user terminal 200 receives the set of policies from the policy recommendation unit 104. The user terminal 200 displays the set of policies on such as a display, and accepts selection of the policy by the user. The user terminal 200 transmits the selected policy to the policy reception unit 105.

Figure 20:
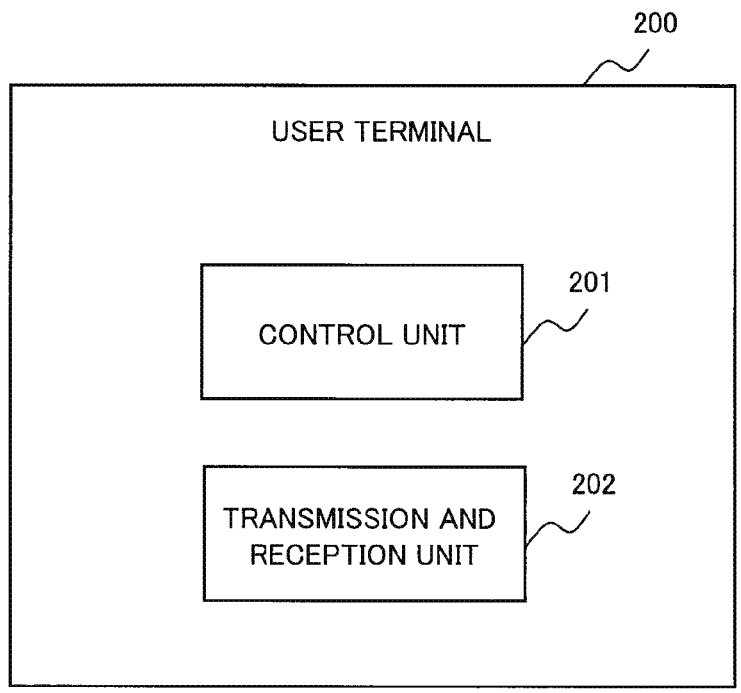
FIG. 20 is a block diagram showing a configuration of a user terminal 200 according to the first exemplary embodiment.

Where, it will describe the configuration in details of the user terminal 200. FIG. 20 is the block diagram showing the configuration of the user terminal 200 according to the first exemplary embodiment. As shown in FIG. 20, the user terminal 200 includes a control unit 201 and a transmission and reception unit 202. The transmission and reception unit 202 of the user terminal 200 receives the set of policies outputted from the policy recommendation unit 104 of the information processing device 100. Then, the control unit 201 of the user terminal 200 displays the received set of policies on the display, which is not illustrated, of the user terminal 200, and prompts the user to select a policy among the received set of policies. The policy selected by the user via an input unit, which is not illustrated, of the user terminal 200 is transmitted by the transmission and reception unit 202 to the information processing device for handling the privacy information 100.

Figure 2:
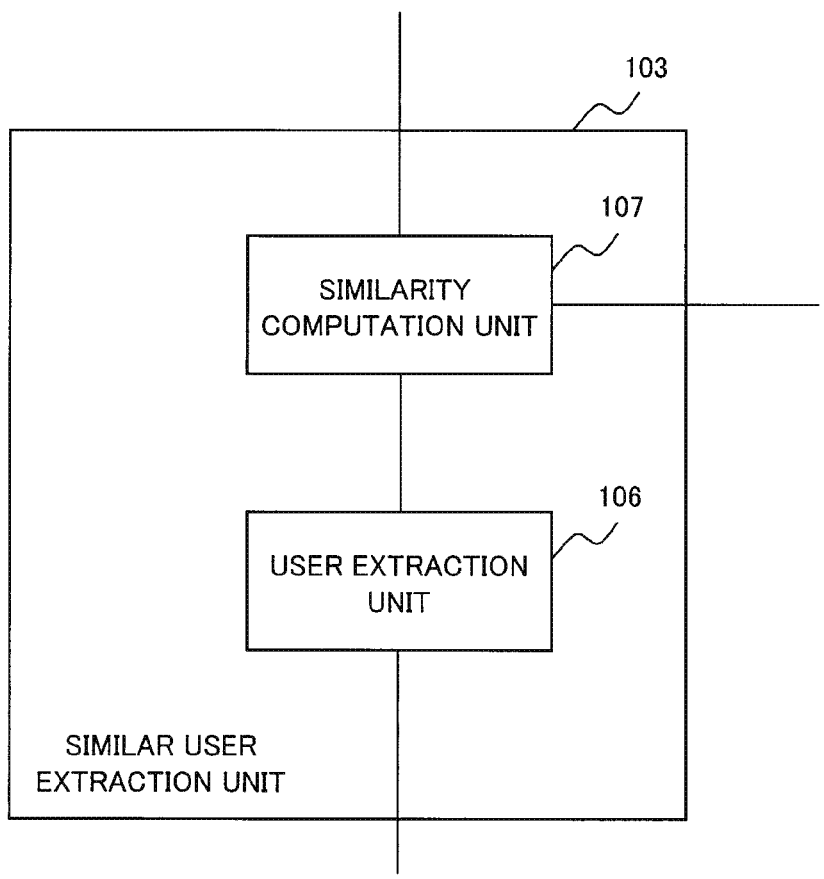
FIG. 2 is a block diagram showing details of a similar user extraction unit 103.

Then, it will describe details of the similar user extraction unit 103 with reference to FIG. 2.

FIG. 2 is the block diagram showing the details of the similar user extraction unit 103. As shown in FIG. 2, the similar user extraction unit 103 includes the user extraction unit 106 and the degree of similarity computation unit 107.

The user extraction unit 106 extracts, from the policy storage unit 101, a set of service identifiers and the policies that are corresponding to the user identifier that is inputted by the user, and a set of the user identifier corresponding to the user service identifier that is inputted by the user.

The user extraction unit 106 outputs the extracted set of service identifiers and policies and the extracted set of user identifiers to the degree of similarity computation unit 105.

The degree of similarity computation unit 107 computes the degree of similarity of the service identifiers based on the set of service identifiers and policies and the set of user identifiers which are extracted by the user extraction unit 106. The degree of similarity computation unit 107 computes the degree of similarity between the user identifiers based on the computed degree of similarity of the service identifiers.

The degree of similarity computation unit 107 may computes the degree of similarity between the user identifiers by computing the degree of similarity of the service identifiers based on reciprocal of distance between policies for each of service identifiers and multiplying the degree of similarity for each of service identifiers. Further, the degree of similarity computation unit 107 may compute the distance between policies as number of data attributes with which the handling method for each of data attributes is different between two policies.

The degree of similarity computation unit 107 extracts a set of user identifiers having higher similarity from the policy storage unit 101 based on the calculated result of the degree of similarity between the user identifiers. The degree of similarity computation unit 107 outputs the extracted set of user identifiers to the policy recommendation unit 104.

Then, it will describe in details overall processes according to the exemplary embodiment.

Figure 3:
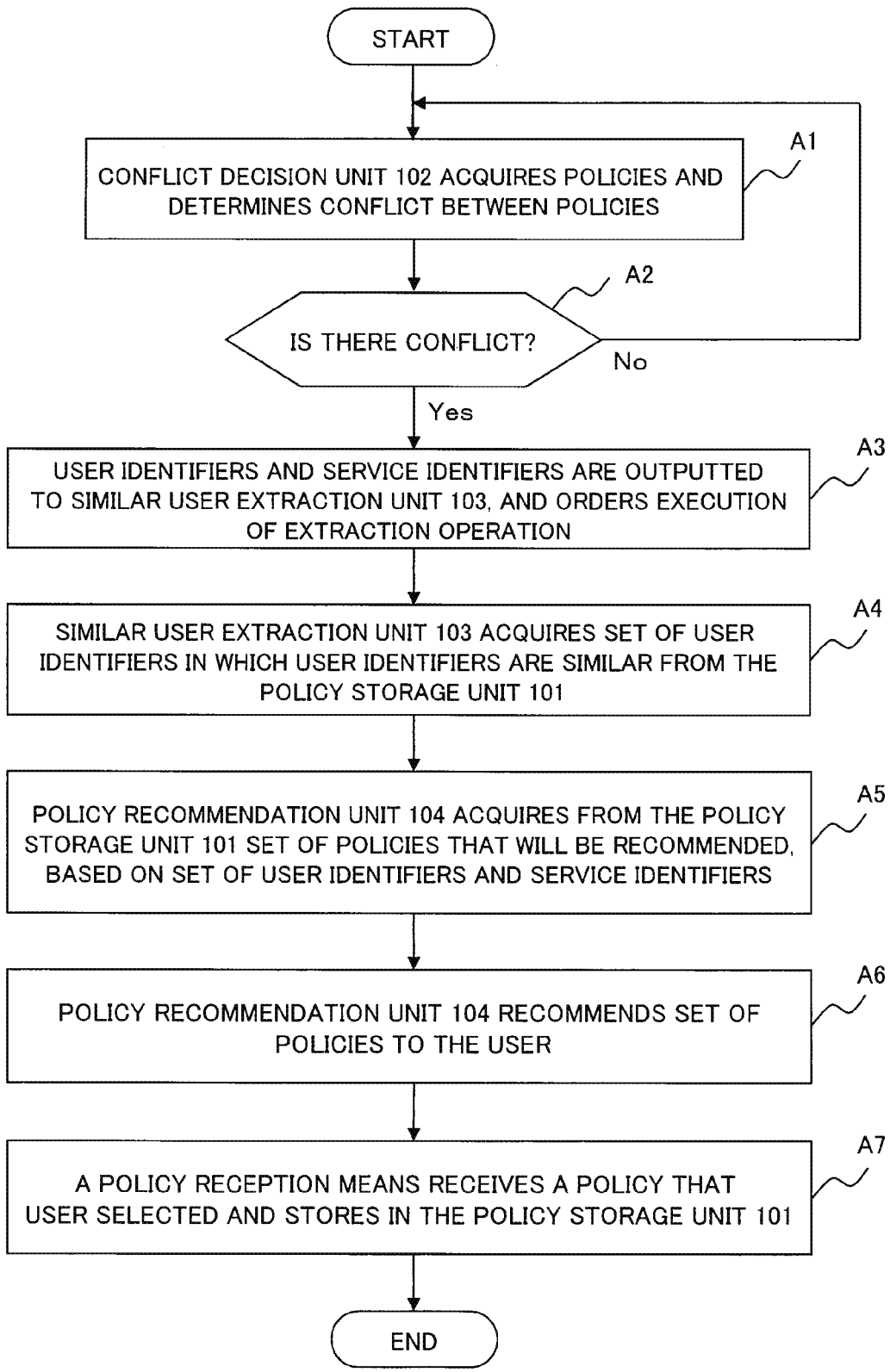
FIG. 3 is a flowchart showing processes of a privacy policy recommendation system 100 according to the first exemplary embodiment.

FIG. 3 is the flowchart showing the processes of the privacy policy recommendation system 100 according to the first exemplary embodiment. As shown in FIG. 3, the user identifier, the service identifier and the user policy are inputted from the user terminal 200 to the conflict decision unit 102. The conflict decision unit 102 acquires the service policy of the service provider which is indicated by inputted service identifier, and determines whether a conflict exists between the user policy and the service policy (A1).

When it is determined that there is a conflict (Yes, in A2), the process advances toward A3. When it is determined that the conflict does not exist (No, in A2), it waits until data are inputted again by the user.

The conflict decision unit 102 transmits the user identifier and the service identifier to the similar user extraction unit 103, and orders execution of the extraction operation (A3).

The similar user extraction unit 103 acquires a set of user identifiers that is similar to the inputted user identifier from the policy storage unit 101 (A4). Specifically, the similar user extraction unit 103 acquires a set of the user identifier having data that are similar of its specified policy assigned for each of the service identifiers, among data having the same service identifier with the service identifier corresponding to the inputted user identifier, among the data that the policy storage unit 101 stores.

The policy recommendation unit 104 acquires from the policy storage unit 101 a set of policies that will be recommended to the user, based on the set of user identifiers that is extracted from the similar user extraction unit 103 and the service identifier that is inputted by the user (A5).

The policy recommendation unit 104 transmits the acquired set of policies to the user terminal 200 and recommends it to the user (A6). Specifically, the policy recommendation unit 104 controls the user terminal 200 so that the set of policies may be displayed on the display.

The policy reception unit 105 receives the policy that the user selected and transmitted from the user terminal 200, and stores in the policy storage unit 101 (A7).

Then, it will describe in details an example of processes of extracting a set of user identifier in A3 of FIG. 3.

Figure 4:
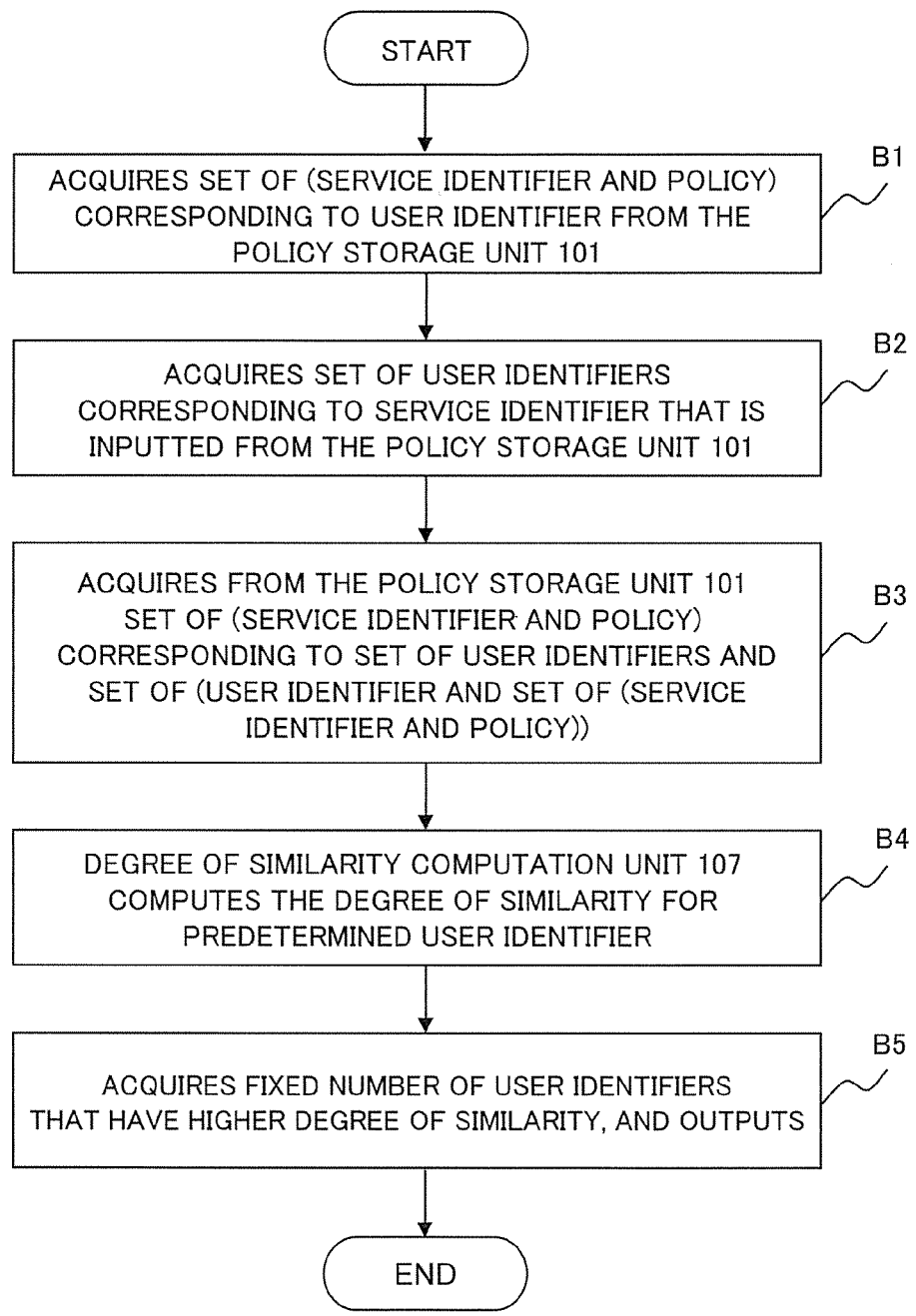
FIG. 4 is a flowchart showing processes in which the similar user extraction unit 103 acquires a set of user identifiers.

FIG. 4 is the flowchart showing the processes that the similar user extraction unit 103 acquires a set of user identifier. As shown in FIG. 4, the user extraction unit 106 acquires a set of tuple of (service identifier and policy) corresponding to the inputted user identifier from the policy storage unit 101 (B1).

The user extraction unit 106 acquires a set of user identifiers corresponding to the service identifier that is inputted by the user from the policy storage unit 101 (B2).

The user extraction unit 106 acquires from the policy storage unit 101 a set of tuple of (service identifier and policy) corresponding to the set of user identifiers acquired in B2 and acquires a set of tuple of (user identifier and set of tuple of (service identifier and policy)) (B3). The user extraction unit 106 outputs the set of tuple of (service identifier and policy) corresponding to the inputted user identifier and the set of tuple of (user identifier and set of tuple of (service identifier and policy)) corresponding to the set of user identifiers, to the degree of similarity computation unit 107.

The degree of similarity computation unit 107 computes the degree of similarity between the user identifiers based on the set of tuple of (service identifier and policy) corresponding to the inputted user identifier, and the set of tuple of (user identifier and set of tuple of (service identifier and policy)) corresponding to the set of user identifiers (B4).

The degree of similarity computation unit 107 acquires a fixed number of user identifiers that have higher similarity, and outputs to the policy recommendation unit 104 as a user set (B5).

Then, it will describe in details an example of processes of computing the degree of similarity of the user identifier in B4 of FIG. 4.

Figure 5:
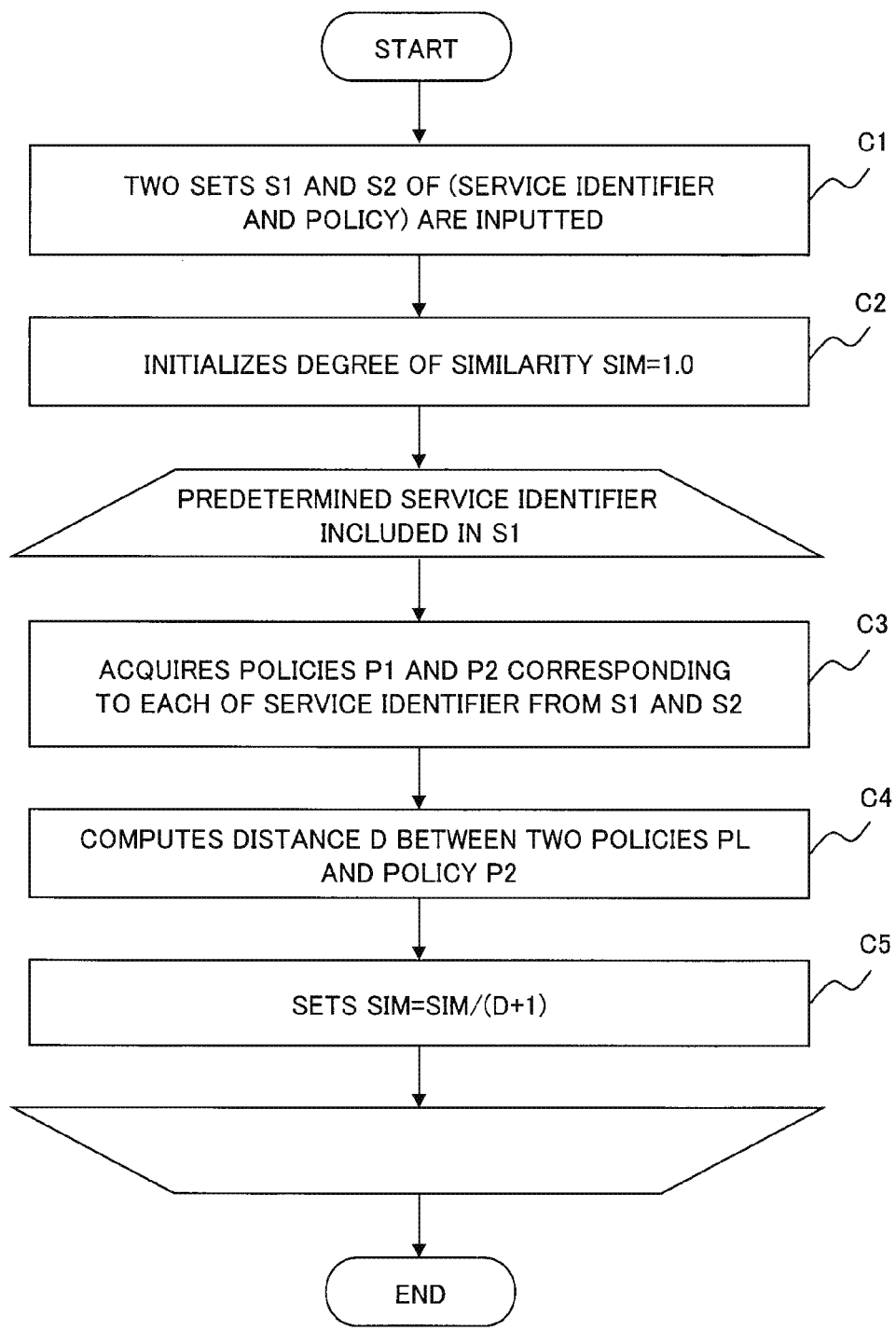
FIG. 5 is a flowchart showing processes in which a degree of similarity computation unit 107 computes a degree of similarity of the user identifier.

FIG. 5 is the flowchart showing the processes that the degree of similarity computation unit 107 computes the degree of similarity of the user identifier. As shown in FIG. 5, S1 and S2, each of them are the set of tuple (i.e. service identifier and policy), are inputted (C1). Where, S1 is the set of tuple of (service identifier and policy) corresponding to the inputted user identifier. Further, S2 is the set of tuple of (service identifier and policy) corresponding to a user identifier which is included in the set of tuple of (user identifier and set of tuple of (service identifier and policy)) corresponding to the set of user identifiers (i.e. set of user identifiers acquired in B2).

The degree of similarity computation unit 107 initializes the degree of similarity of the user identifier (C2). For example, when the degree of similarity is expressed by Sim, the degree of similarity computation unit 107 set Sim=1.0.

The degree of similarity computation unit 107 repeats C3 to C5 that are described as follows, for the specified service identifier included in S1. Further, although it describes that the service identifiers are specified, in order to compute the degree of similarity of the user identifiers, the degree of similarity computation unit 107 may set all service identifiers as a target or it may set a part of service identifiers as the target.

The degree of similarity computation unit 107 acquires policy P1 and policy P2 corresponding to the service identifier from S1 and S2 respectively for each one of the service identifiers included in S1 (C3).

The degree of similarity computation unit 107 computes a distance d between these two policies P1 and P2 (C4). When P2 corresponding the service identifier does not exist in S2, the degree of similarity computation unit 107 may set d=0. The distance between policies may be computed by difference of number of actions to the data attributes in the policy as an example, and it is not only limited to this but also may be computed by other methods. In the exemplary embodiment, it is supposed that the degree of similarity computation unit 107 computes the distance between policies by difference of number of actions to the data attributes in the policy.

The degree of similarity computation unit 107 computes the degree of similarity of the service identifier based on reciprocal of distance between policies for each of service identifiers. That is, the degree of similarity computation unit 107 computes the degree of similarity of the service identifier as Sim=Sim/(d+1) (C5). Further, the degree of similarity of the service identifiers may be computed not only by the above method but also by other methods.

Further, the degree of similarity computation unit 107 computes the degree of similarity between the user identifiers by multiplying the degree of similarity of each of the service identifiers. Where, the degree of similarity of the user identifiers may be computed not only by the above method but also by other methods.

Then, it will describe the exemplary example according to the first exemplary embodiment of the present invention using detailed examples and the above-mentioned flowcharts.

FIG. 6 is the diagram showing the example of the policy according to the present exemplary example. As shown in FIG. 6, according to the present exemplary example, it describes the policy by an example in which it set two numerical values including "provide" and "not provide" for actions to the data attributes using action-tags and is written in XML. According to the policy shown in FIG. 6, it describes the user's "name", "address", "position information" and "buying information" as the privacy information, and it represents whether it "provide" or "not provide" these information to the service providers. Specifically, FIG. 6 indicates an example of the policy in which "name" is "provide", "address" is "not provide", "position information" is "not provide" and "buying information" is "provide."

FIG. 7 is the diagram showing the example of data stored in the policy storage unit 101. As shown in FIG. 7, the policy storage unit 101 associates the user identifier, the service identifier and the policy and stores them. The policy arbitration has completed between the privacy information holder and the privacy information user for those data that the policy storage unit 101 stores.

Hereinafter, it will describe the processes of the privacy policy recommendation system 1000 in a situation that the privacy information holder with user identifier=1 will request provision of services to the privacy information user with service identifier=3.

The user who is the privacy information holder with user identifier=1 inputs his user identifier=1, requesting service provider with service identifier=3 and his/her user policy to the user terminal 200.

FIG. 8 is the diagram showing the example of the user policy of the user with user identifier=1. As shown in FIG. 8, the user with user identifier=1 set "name" is "provide, "address" is "not provide", "position information" is "not provide" and "buying information" is "not provide" as the policy The user terminal 200 outputs the user identifier, the service identifier and the user policy that are inputted by the user to the conflict decision unit 102 of the privacy policy recommendation device 100.

The conflict decision unit 102 receives "user identifier=1", "service identifier=3" and the user policy shown in FIG. 8 from the user terminal 200, and determines whether the conflict exists between the user policy and the service policy (A1). First of all, in order to determine whether conflicts are existing or not, the conflict decision unit 102 acquires the service policy of the service identifier inputted by the user from the outside. The conflict decision unit 102 may directly inquire the service policy to the privacy information user, or it may inquire to an outside database that assembles the service policies of each of the privacy information users.

FIG. 9 is the diagram showing the example of the service policy of the service provider with service identifier=3. As shown in FIG. 9, the service provider with service identifier=3 requests to "provide" four privacy information.

The conflict decision unit 102 determines whether the conflict exists between the user policy shown in FIG. 8 and the service policy shown in FIG. 9. According to the present exemplary example, in the conflict judgment of the service policy with service identifier=3 meaning that it requests to "provide" the specified privacy information, if the user policy includes either (1) "position information" is set to "not provide" or (2) no smaller than three data attributes are set to "not provide", then the conflict decision unit 102 may determine that the conflict exists. Above-mentioned determination method is one of the examples, and the conflict decision unit 102 may determine existence of the conflicts by other various indexes. In addition, although it describes that the privacy information are specified, it can be all the privacy information or can be a part of the privacy information.

Because the user policy shown in FIG. 8 indicates that "position information" is set to "not provide", the conflict decision unit 102 determines that the conflict exists between the user policy and the service policy (Yes, in A2).

The conflict decision unit 102 outputs user identifier=1 and service identifier=3 to the similar user extraction unit 103 and orders execution of an extraction operation (A3).

When user identifier=1 is inputted from the conflict decision unit 102, the similar user extraction unit 103 acquires a set of user identifiers that is similar to user identifier=1 from the policy storage unit 101 (A4). In other words, the similar user extraction unit 103 acquires a set of user identifiers in which the data with user identifier=1 are the same as that of the service identifier and the data of the specified policies are similar.

It will describe in details processes of the extraction operation in the similar user extraction unit 103.

First, the user extraction unit 106 acquires a set of tuple of (service identifier and policy) corresponding to the inputted user identifier from the policy storage unit 101 (B1).

FIG. 10 is the diagram showing the example of the set of tuple of (service identifier and policy) that the user extraction unit 106 extracts. According to the present exemplary example, the user extraction unit 106 extracts data with user identifier=1 from the data in FIG. 7 which the policy storage unit 101 stores, and acquires the data as shown in FIG. 10.

Then, the user extraction unit 106 acquires a set of user identifiers corresponding to the inputted service identifier from the policy storage unit 101 (B2). When referring to the data in FIG. 7, user identifiers in which service identifier=3 is set are "2", "3" and "4". Therefore, the user extraction unit 106 acquires a set of user identifiers {"2", "3" and "4"}.

Then, the user extraction unit 106 acquires a set of tuple of (service identifier and policy) corresponding to the set of the user identifier, and a set of tuple of (user identifier and set of tuple of (service identifier and policy)) from the policy storage unit 101 (B3).

When referring to FIG. 7, the service identifiers which are corresponding to each in the set of user identifiers {"2", "3" and "4"} are the service identifiers {"1", "2" and "3"} for user identifier=2, the service identifiers {"1", "2" and "3"} for user identifier=3 and the service identifiers {"2" and "3"} for user identifier=4. Therefore, as the set of tuple of (user identifier and set of tuple of (service identifier and policy)), the user extraction unit 106 acquires the data as shown in FIG. 11.

Then, the user extraction unit 106 outputs the set of tuple of (service identifier and policy) corresponding to the inputted user identifier (as shown in FIG. 10), and the set of tuple of (service identifier and policy) corresponding to one of the user identifiers (e.g. set correspond to user identifier=2 in FIG. 11) that is included in the set of the user identifier, to the degree of similarity computation unit 107. The degree of similarity computation unit 107 computes the degree of similarity of the user identifier (B4).

Hereinafter, it describes the processes in which it computes the degree of similarity with user identifier=2 as an example.

First, two sets S1 and S2, each of them are set of tuple of (service identifier and policy), are inputted to the degree of similarity computation unit 107 (C1). S1 is the set of tuple of (service identifier and policy) corresponding to the inputted user identifier (as shown in FIG. 10). S2 is the set of tuple of (service identifier and policy) corresponding to one of the user identifiers (i.e. the set in case of user identifier=2 in FIG. 11) that is included in the set of user identifiers.

FIG. 12 is the diagram showing the example of S1 and S2 which are inputted to the degree of similarity computation unit 107. The degree of similarity computation unit 107 receives data as shown in FIG. 12.

Then, the degree of similarity computation unit 107 performs initialization of the degree of similarity to Sim=1.0 (C2).

Then, the degree of similarity computation unit 107 repeats Step C3 to Step C5 which will be described hereinafter, for the specified service identifier included in S1. According to the present exemplary example, although it will be repeated with service identifier=1 and service identifier=2, the followings will describe when service identifier=1 as an example.

The degree of similarity computation unit 107 acquires policies P1 and P2 corresponding to the service identifier included in S1 and S2 respectively for single service identifier (C3).

FIG. 13 is the diagram showing the example of the policies that the degree of similarity computation unit 107 acquires for service identifier=1. The degree of similarity computation unit 107 acquires policies P1 and P2 as shown in FIG. 13 for service identifier=1.

Then, the degree of similarity computation unit 107 computes distance d between these two policies P1 and P2 (C4). According to the present exemplary example, as a calculation method of the distance between policies, it uses a number of differences of actions to the data attributes in the policies.

Specifically, "name" is "not provide", "address" is "not provide", "position information" is "not provide" and "buying information" is "provide" are set in P1. On the other hand, in the same way, "name" is "not provide", "address" is "not provide", "position information" is "not provide" and "buying information" is "provide" are set in P2, and the number of differences of actions becomes zero. Therefore, the degree of similarity computation unit 107 computes the distance of the policy with service identifier=1 at between user identifier=1 and user identifier=2, and it becomes d=0.

The degree of similarity computation unit 107 computes Sim=Sim/(d+1) (C5). Where, because Sim is initialized to Sim=1.0, the degree of similarity computation unit 107 computes Sim to Sim=1.0/(0+1)=1.0. That is, the degree of similarity computation unit 107 computes the degree of similarity with service identifier=1 between user identifier=1 and user identifier=2, and it becomes 1.0.

Step C3 to Step C5 are repeated for the specified service identifiers included in S1. Because the degree of similarity computation unit 107 also computes distance d=0 for service identifier=2, Sim becomes Sim=1.0/(0+1)=1.0 again. That is, the degree of similarity computation unit 107 computes that the degree of similarity between user identifier=1 and user identifier=2 becomes 1.

FIG. 14 is the diagram showing the distance of each of service identifiers to the specified user identifier that is the target of computation of the degree of similarity. As shown in FIG. 14, the distance of user identifier=4 and service identifier=1 becomes 0. When referring to FIG. 11, user identifier=4 does not have the data of service identifier=1. Where, when P2 corresponding to the service identifier of P1 does not exist in S2, the degree of similarity computation unit 107 may set d=0. Further, although it has described that the user identifier is specified, targets that the degree of similarity computation unit 107 may compute the degree of similarity of user identifiers can be all the user identifiers or it may be a part of the user identifiers.

FIG. 15 is the diagram showing the degree of similarity between user identifier=1 and other specified user identifier. For example, when considering the degree of similarity with user identifier=3, distance of service identifier=1 and service identifier=2 will be 4 and 2 respectively. Therefore, the degree of similarity computation unit 107 computes the degree of similarity of service identifier=1 between user identifier=1 and the user identifier=3, and it becomes Sim=1.0/(4+1)=⅕. Further, the degree of similarity computation unit 107 computes the degree of similarity of service identifier=2 between the identifier=1 and user identifier=3, and it becomes Sim=1.0/(2+1)=⅓.

According to the present exemplary example, the degree of similarity computation unit 107 computes the degree of similarity between the user identifiers by multiplying degree of similarity for each of service identifiers. Specifically, the degree of similarity computation unit 107 computes the degree of similarity between user identifier=1 and user identifier=3, and it becomes ⅕×⅓=1/15.

Then, the degree of similarity computation unit 107 acquires a specified number of the user identifier with higher degree of similarity, and outputs as a set of similar user identifiers (B5 and A4). According to the present exemplary example, when it is supposed that two user identifiers are to be outputted, the degree of similarity computation unit 107 outputs a set of user identifiers {"2" and "4"}.

Then, the policy recommendation unit 104 acquires the set of policies that will be recommended to the user from the policy storage unit 101, based on the set of the user identifier that is outputted from the degree of similarity computation unit 107 and the service identifier that is inputted by the user (A5). Specifically, for each of user identifier=2 and user identifier=4, the policy recommendation unit 104 acquires a policy with service identifier=3 from the data shown in FIG. 7.

FIG. 16 is the diagram showing the example of the set of policies recommends to the user.

Then, the policy recommendation unit 104 transmits acquired set of policies to the user terminal 200 and recommends them to the user (A6).

The policy reception unit 105 receives a policy that is selected by the user and transmitted from a user terminal, and stores in the policy storage unit 101 (A7). For example, supposing that the user selects the same policy as user identifier=4, the policy storage unit 101 updates as shown in FIG. 17.

FIG. 17 is the diagram showing the state when the data of the policy storage unit 101 is updated according to the present invention. As shown in FIG. 17, the data of service identifier=3 with user identifier=1 is added to the data shown in FIG. 7. The newly added policy is set to: "name" is "provide"; "address" is "not provide"; "position information" is "provide"; and "buying information" is "not provide".

Because the policy matches neither (1) "position information" is set to "not provide" nor (2) no smaller than three data attributes are set to "not provide", conflicts with the service policy with services identifier=3 do not occur.

As it has been described above, in the privacy policy recommendation system 1000 according to the first exemplary embodiment, when conflicts take place between policies, the policy can be decided easily in a trouble-free manner between the privacy information holder and the privacy information user.

The reason is because; when the conflict decision unit 102 judges that a conflict is taking place among policies, the similar user extraction unit 103 extracts a set of other privacy information holders who set a policy similar to that of the privacy information holder, and the recommendation unit 104 recommends the policy which a privacy information holder, whose tendency of the policy is similar, set for the privacy information user.

By adopting the above-mentioned configuration, when the privacy policy recommendation system 1000 determines that the conflict is taking place, it can appropriately set a policy which the policy arbitration is already completed, without performing complicated policy arbitrations for each of privacy information users.

Second Exemplary Embodiment

It will describe in details the second exemplary embodiment of the present invention with reference to the drawings.

Figure 18:
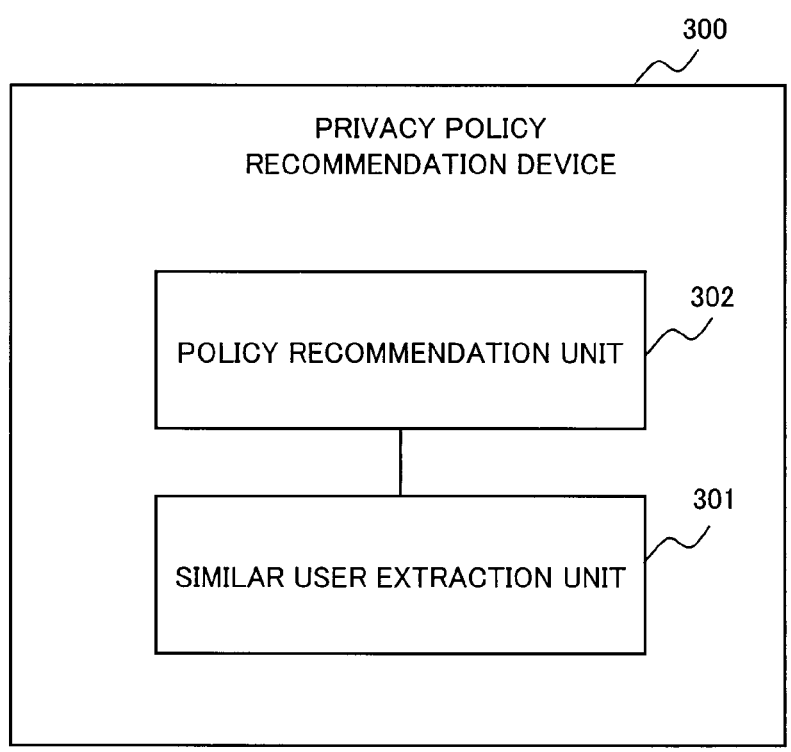
FIG. 18 is a block diagram showing a configuration of a privacy policy recommendation device 300 according to the second exemplary embodiment.

FIG. 18 is the block diagram showing the configuration of the privacy policy recommendation device 300 according to the second exemplary embodiment. As shown in FIG. 18, the privacy policy recommendation device 300 includes a similar user extraction unit 301 and a policy recommendation unit 302.

The similar user extraction unit 301 executes an extraction operation in which it extracts a set of other user's identifiers that are similar to the user identifier that is inputted by the user, when a conflict takes place between a policy that is inputted by the user, who is a privacy information holder, and the policy of services that is already set for each of service providers, who is the privacy information user.

The similar user extraction unit 301 acquires a set of policies based on a set of user identifiers which the policy recommendation unit 302 extracted and the service identifier that is inputted by the user, and outputs thereof.

As is described above, according to the privacy policy recommendation device 300 according to the second exemplary embodiment, when a conflict takes place among policies, it can easily decide the policy between the privacy information holder and the privacy information user in a trouble-free manner.

Figure 19:
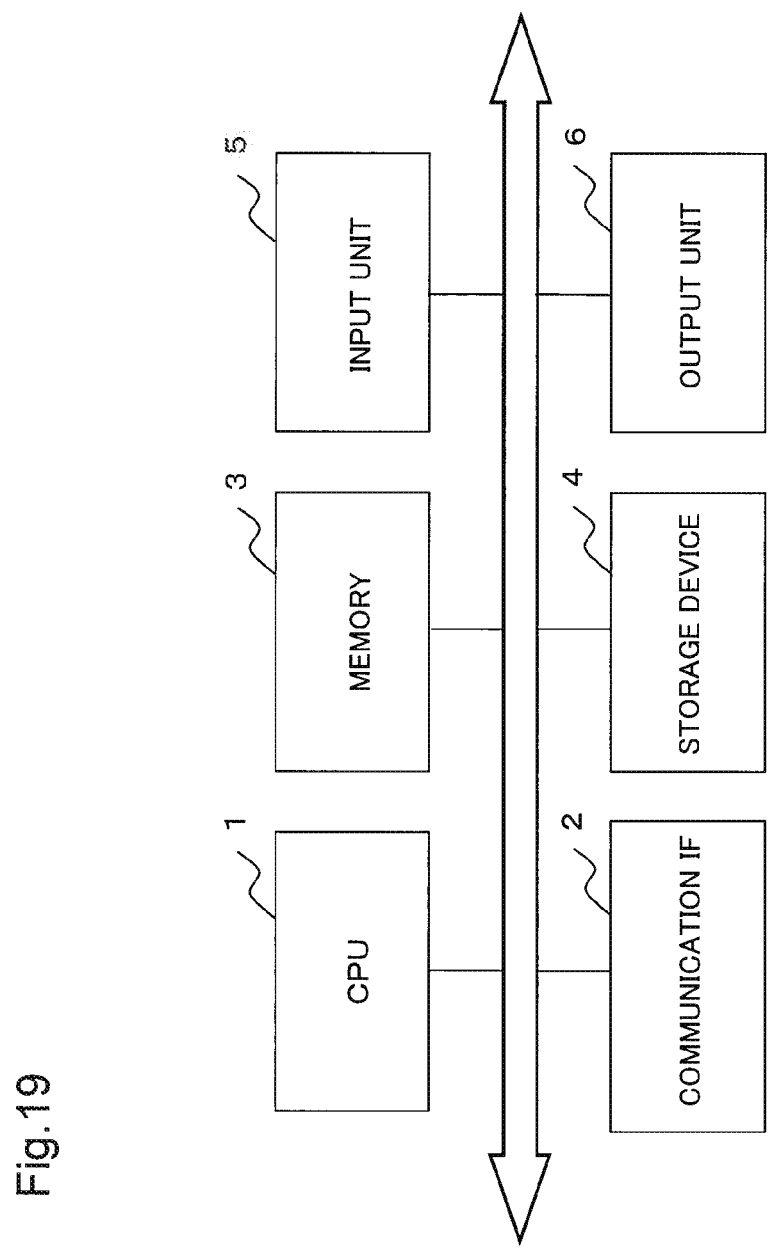
FIG. 19 is a block diagram showing an example of a hardware configuration of a privacy policy recommendation device 100 according to the first exemplary embodiment.

FIG. 19 is the block diagram showing the example of the hardware configuration of the privacy policy recommendation device 100 and the privacy policy recommendation device 300 according to the second exemplary embodiment. As shown in FIG. 19, the privacy policy recommendation device is realized by a computer device in which it is configured by each of units including a CPU 1 (Central Processing Unit 1), a communication IF 2 (communication interface 2) for network connections, a memory 3 and a storage device 4 such as hard disks for storing programs, and the computer device is connected with an input unit 5 and a output unit 6 via a bus. However, the configuration of the privacy policy recommendation device is not limited to the computer device shown in FIG. 19.

The CPU 1 controls the privacy policy recommendation device 300 by executing an operating system. In addition, the CPU 1 readouts the programs and data from such as a recording medium loaded on a driving device to the memory 3, and executes various processes based on these.

For example, the CPU 1 and the programs may realize the conflict decision unit, the similar user extraction unit, the policy recommendation unit and the policy reception unit.

The storage device 4 includes such as an optical disk, a flexible disk, a magneto-optical disk, an external hard disk or a semiconductor memory or the like, and records computer programs so that these can be readout by the computer. In addition, the computer programs may be downloaded from outside computers, which are connected with the communication network and are not illustrated.

For example, the policy storage unit may be realized by the storage device 4.

The input unit 5 is a mouse and a keyboard or the like. The output unit 6 is a display or the like. The privacy policy recommendation device may include the input unit and the output unit by itself, or these can be included in a user terminal that is communicated via the communication IF 2.

Further, above described block diagrams (i.e. FIG. 1, FIG. 2 and FIG. 18) of each of the exemplary embodiments indicate blocks of the function units, and not the configurations of the hardware units. These functional blocks are realized by optional combination of the hardware units and the software programs. In addition, there are no specific limitations on a realization means of the units composing the privacy policy recommendation device. That is, the privacy policy recommendation device may be realized by a physically combined device, or two or more physically separated devices are connected by a wired means or a wireless means, and is realized by a plurality of these devices.

Further, according to each of above-mentioned exemplary embodiments, although it described with the example using the privacy policy recommendation device or the privacy policy recommendation system, it is not limited to these, and the present invention can be applied to any information processing devices for handling the privacy information or any information processing system for handling the privacy information.

Other Expression of Exemplary Embodiment

In each of above-mentioned exemplary embodiments, it has described characteristic configurations of the information processing device for handling the privacy information, the information processing system for handling the privacy information, the information processing method for handling the privacy information and the programs thereof as will be described as follows (note that it is not limited to the followings). Further, the programs according to the present invention may be the programs that execute with the computer each of processes described in each of above-mentioned exemplary embodiments.

(Supplement Note 1) An information processing device for handling privacy information comprising: a similar user extraction means for extracting a set of other user's identifiers that is similar to a user identifier inputted by a user when a conflict takes place between a policy inputted by a user, who is a privacy information holder, and a policy of services that is already set for each of service providers, who is a privacy information user; and a policy recommendation means for acquiring a set of policies based on said set of extracted user identifiers and a service identifier inputted by said user and outputting thereof.

(Supplement Note 2) The information processing device for handling the privacy information according to Supplement Note 1, further comprising: a conflict decision means for determining whether a conflict exists between the policy inputted by the user, who is the privacy information holder, and the policy of services that is already set for each of the service providers, who is the privacy information user.

(Supplement Note 3) The information processing device for handling the privacy information according to Supplement Note 1 or 2, further comprising: a policy storage means for storing a user identifier for identifying the user who is the privacy information holder, a service identifier for identifying the service provider who is the privacy information user and a policy for specifying handling of privacy information for each of the service identifiers, wherein said similar user extraction means extracts from said policy storage means a set of other user's identifiers in that service identifiers and policies similar to service identifiers and policies corresponding to the user identifier inputted by said user were set as a set of similar user identifiers, and said policy recommendation means acquires said set of policies from said policy storage means.

(Supplement Note 4) The information processing device for handling the privacy information according to Supplement Note 3, further comprising: a policy reception means for receiving the policy that said user selected from the set of policies that is outputted from said policy recommendation means, correlating with the user identifiers and the service identifiers and storing in said policy storage means.

(Supplement Note 5) The information processing device for handling the privacy information according to Supplement Note 3 or 4, wherein the policy stored in said policy storage means specifies handling of the privacy information by describing data attributes for specifying type of data and a handling method of the data attributes.

(Note 6) The information processing device for handling the privacy information according to any one of Supplement Notes 3 to 5, wherein said similar user extraction means comprising: a user extraction means for extracting from said policy storage means a set of user identifiers and policies that is corresponding to the service identifier inputted by said user and a set of user identifiers that corresponds to the service identifier inputted by said user; and a degree of similarity computation means for computing degree of similarity between the user identifiers based on degree of similarity that is computed based on said extracted set of service identifiers and policies and the set of user identifiers.

(Supplement Note 7) The information processing device for handling the privacy information according to Supplement Note 6, wherein said degree of similarity computation means computes degree of similarity between said user identifiers by computing degree of similarity of said service identifier based on a reciprocal of distance between policies of each of service identifiers and by multiplying degree of similarity on each of the service identifiers.

(Supplement Note 8) The above-mentioned degree of similarity computation means is the information processing device for handling the privacy information as described in Supplement Note 7, and computes the distance between above-mentioned policies as a number of data attribute with which the handling method for each of data attributes discords between two policies.

(Supplement Note 9) An information processing system for handling privacy information comprising: the information processing device for handling the privacy information according to Supplement Notes 1-8; and a user terminal for transmitting a policy that is selected by user's input among a set of policies that is outputted from said policy recommendation means to said information processing device for handling the privacy information.

(Supplement Note 10) An information processing method for handling privacy information, comprising: extracting a set of other user's identifiers that is similar to a user identifier inputted by a user when a conflict takes place between a policy inputted by the user, who is a privacy information holder, and a policy of services that is already set for each of service providers, who is a privacy information user; and acquiring a set of policies based on a set of said extracted user identifiers and a service identifier that is inputted by said user and outputting thereof.

(Supplement Note 11) A program for a computer to execute processes comprising: extracting a set of other user's identifiers that is similar to a user identifier that is inputted by a user when a conflict takes place between a policy inputted by a user, who is a privacy information holder, and a policy of services that is already set for each of service providers, who is a privacy information user, and acquiring a set of policies based on a set of said extracted user identifiers and a service identifier that is inputted by said user and outputting thereof.

(Supplement Note 12) A user terminal for transmitting a policy that is selected by the user's input among a set of policies that is outputted by said policy recommendation means of the information processing device for handling the privacy information according to Supplement Note 1 to said information processing device for handling the privacy information.

While the invention has been particularly shown and described with reference to the exemplary embodiments and the exemplary examples thereof, the invention is not limited to above-mentioned exemplary embodiments and exemplary examples. It is to be understood that to the configurations and details of the invention of the present application, various changes can be made within the scope of the invention of the present application by those skilled in the arts. This application is based upon and claims the benefit of priority from Japanese patent application No. 2012-32991, filed on Feb. 17, 2012, the disclosure of which is incorporated herein in its entirety by reference.

INDUSTRIAL APPLICABILITY

The present invention is applicable to various applications such as setting of a privacy policy in recommendation services and SNS services which utilize the privacy information.

REFERENCE SIGNS LIST

1 CPU
2 Communication IF
3 Memory
4 Storage Device
5 Input Unit
6 Output Unit
100 and 300 Privacy Policy Recommendation Device
101 Policy Storage Unit
102 Conflict Decision Unit
103 and 301 Similar User Extraction Unit
104 and 302 Policy Recommendation Unit
105 Policy Reception Unit
106 User Extraction Unit
107 Degree of Similarity Computation Unit
200 User Terminal
1000 Privacy Policy Recommendation System

What is claimed is:
1. An information processing device comprising:
a circuitry configured to:
extract a set of other user's identifiers that is similar to a user identifier input by user, who is the privacy information holder when a conflict takes place between a policy input by the user and a policy of services that is already set for each of service providers as a privacy information user;
acquire a set of policies based on said set of extracted user identifiers and a service identifier input by said user and output the acquired set of policies; and
determine whether a conflict exists between the policy input by the user, who is the privacy information holder, and the policy of services that is already set for each of the service providers, who is the privacy information user.
2. The information processing device according to claim 1, further comprising:
a policy storage configured to store the user identifier, the service identifier and a policy for specifying handling of privacy information for each of the service identifiers,
wherein the circuitry extract from said policy storage a set of other user's identifiers in which the service identifiers and policies similar to the service identifiers and the policies corresponding to the user identifier input by said user were set as a set of similar user identifiers, and
the circuitry acquires said set of policies from said policy storage.
3. The information processing device for handling the privacy information according to claim 2, wherein the circuitry is further configured to:
receive the policy that said user selected from the set of policies that is output, correlate with the user identifiers and the service identifiers and store in said policy storage.
4. The information processing device according to claim 2, wherein
the policy stored in said policy storage specifies handling of the privacy information by describing data attributes and a handling method of the data attributes.
5. The information processing device according to claim 2, wherein the circuitry is configured to:
extract from said policy storage a set of user identifiers and policies that is corresponding to the service identifier input by said user and a set of user identifiers that corresponds to the service identifier input by said user; and
calculate first similarity between the user identifiers based on second similarity that is computed based on said extracted set of service identifiers and policies and the set of user identifiers.
6. The information processing device for handling the privacy information according to claim 5, wherein
the first similarity is computed between said user identifiers by computing the second similarity of said service identifier based on a reciprocal of distance between policies of each of service identifiers and by multiplying degree of similarity on each of the service identifiers.
7. An information processing system comprising:
the information processing device according to claim 1; and
a user terminal for transmitting a policy that is selected by user's input among a set of policies that is output from the circuitry to said information processing device.
8. A user terminal for transmitting a policy that is selected by the user's input among a set of policies that is output from the circuitry to the information processing device according to claim 1.
9. An information processing method for handling privacy information comprising:
extracting, by a circuitry, a set of other user's identifiers that is similar to a user identifier input by a user, who is the privacy information holder when a conflict takes place between a policy input by the user and a policy of services that is already set for each of service providers as a privacy information user;
acquiring, by the circuitry, a set of policies based on a set of said extracted user identifiers and a service identifier that is input by said user and outputting the acquired set of policies; and
determining, by the circuitry, whether a conflict exists between the policy input by the user, who is the privacy information holder, and the policy of services that is already set for each of the service providers, who is the privacy information user.

10. A non-transitory computer readable medium stores a program causing a computer to execute information process, comprising:

extracting, by the computer, a set of other user's identifiers that is similar to a user identifier input by a user, who is the privacy information holder when a conflict takes place between a policy input by the user and a policy of services that is already set for each of service providers as a privacy information user;

acquiring, by the computer, a set of policies based on a set of said extracted user identifiers and a service identifier that is input by said user and outputting the acquired set of policies; and determining, by the computer, whether a conflict exists between the policy input by the user, who is the privacy information holder, and the policy of services that is already set for each of the service providers, who is the privacy information user.

\* \* \* \* \*